INVENTORS
ARTHUR MILLER &
MAXWELL M. HOPKINS

BY
ATTORNEY 3,531,779
METHOD FOR POLING BISMUTH TITANATE
Maxwell M. Hopkins, Kendall Park, and Arthur Miller, Princeton Junction, N.J., assignors to RCA Corporation, a corporation of Delaware
Filed Nov. 1, 1968, Ser. No. 772,761
Int. Cl. G11c 11/22
U.S. Cl. 340—173.2
9 Claims

ABSTRACT OF THE DISCLOSURE

A method for orienting ferroelectric domains about the $a$-axis of a bismuth titanate crystal comprises heating the crystal to a temperature somewhat below the Curie temperature and subjecting the heated crystal to a pulsed electric field by means of offset electrodes on opposite major faces of the crystal.

BACKGROUND OF THE INVENTION

This invention relates to ferroelectric bismuth titanate ($Bi_4Ti_3O_{12}$) crystals useful as switching elements and particularly to a method for poling the ferroelectric domains of these crystals. The invention herein described was made in the course of or under a contract or subcontract thereunder with the Department of the Air Force.

The use of ferroelectric bismuth titanate crystals for the storage of information is known in the art. For example, a bi-stable, optically read, ferroelectric memory device employing ferroelectric bismuth titanate crystals is described in U.S. Pat 3,374,473, issued to Stewart E. Cummins. In that device, the bismuth titanate crystal is switched betwen two stable polarization states having different optical properties by means of a momentary application of an electric field. Practical use of the above invention requires bismuth titanate crystals which have their ferroelectric domains poled with respect to the crystallographic $a$-axis.

Heretofore, such crystals have not been readily available. The problems in obtaining well-poled bismuth titanate arise from several factors. For example, poling of bismuth titanate crystals at or near room temperature is not feasible because the coercive force along the $a$-axis is extremely high and requires an electric field in excess of the breakdown field of the crystal. Another factor is that the high resistivity of the crystal hinders poling due to excessive heating of the crystal. Also, poling by the usual method employed in other materials where the crystal is cooled through its Curie transition temperature while being subjected to a modest electric field has been found to be unsuitable in the case of bismuth titanate. The latter method is probably unsuitable because the Curie transition in bismuth titanate is first order and the coercive field does not vanish at temperature immediately below the Curie temperature.

SUMMARY OF THE INVENTION

A method for poling a ferroelectric bismuth titanate crystal about its crystallographic $a$-axis comprises heating the crystal to a temperature from between about 1–30° C. below its Curie temperature, and subjecting the heated crystal to a pulsed electric field applied across opposite $ab$ crystallographic surfaces of the crystal.

DETAILED DESCRIPTION OF THE PREFERRED EMBODIMENTS

A crystal is said to be poled with respect to a particular crystal axis when the ferroelectric polarization vector of each ferroelectric domain of the crystal, is aligned so as to have a component along said crystal axis which is in the same direction as the vector component of all other ferroelectric domains of the crystal. This will be amplified with reference to FIG. 1.

Bismuth titanate crystals have three essentially mutually perpendicular crystallographic axes. These are the $a$-axis, the $b$-axis and the $c$-axis. These crystals usually have an essentially two dimensional growth habit which results in thin, mica-like crystals. A major surface of these crystals is parallel to the crystallographic $ab$ plane. That is, the major surface is defined by the plane in which both the $a$-axis and $b$-axis lie.

Figure 1:
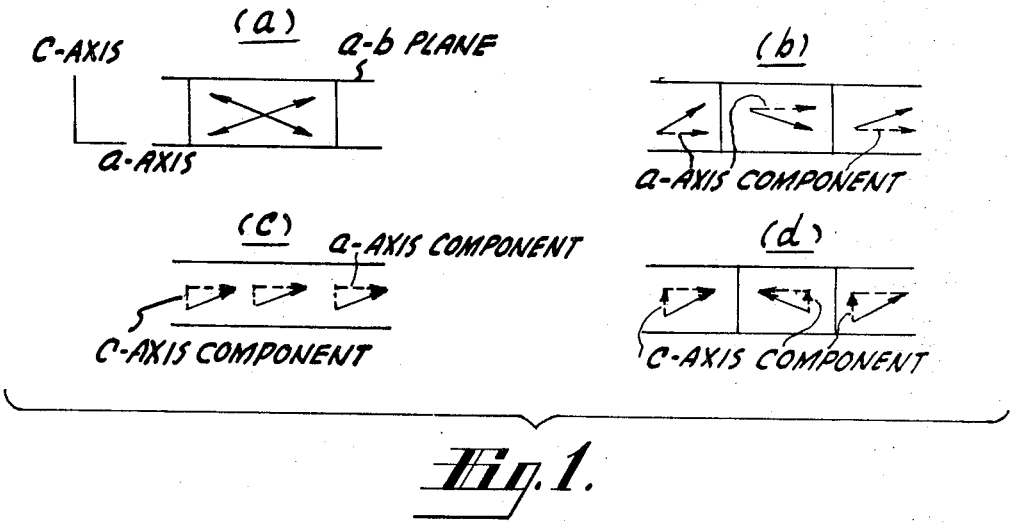
FIG. 1 is a representation of a ferroelectric domain in a bismuth titanate crystal showing the crystal axes and the various directions in which the ferroelectric domain can be poled with respect to these axes.

FIGS. 1$a$–$d$ indicates some of the directions in which the ferroelectric domains of $Bi_4Ti_3O_{12}$ can be poled. FIG. 1$a$ indicates four possible directions of alignment of a ferroelectric domain. FIG. 1$b$ represents a crystal that is poled with respect to its $\alpha$-axis. It can be seen that all of the domains shown in FIG. 1$b$ have their $a$-axis component of the polarization vector in the same direction. FIG. 1$c$ represents a crystal having its ferroelectric domains poled with respect to both the $a$-axis and the $c$-axis. This is a single crystal structure. In FIG. 1$d$ is a crystal which is poled only with respect to the $c$-axis. It can be seen that only the $c$-axis components of the polarization vector are facing the same direction. The center domain has its $a$-axis component opposite that of the two adjacent domains.

There are four possible directions of polarization in untwinned crystals and 8 possible directions of polarization in twinned crystals. Four of the directions of polarization in twinned crystals can be removed by heating the crystals as hereinafter described to remove the twinning.

Figure 2:
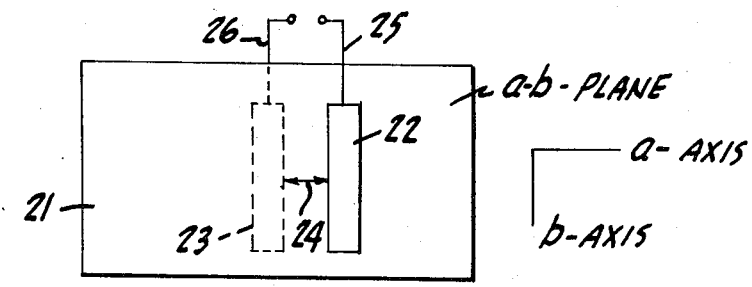
FIG. 2 is a plan view of a bismuth titanate crystal showing an electrode pattern useful for poling the crystal in accordance with the invention.
Figure 3:
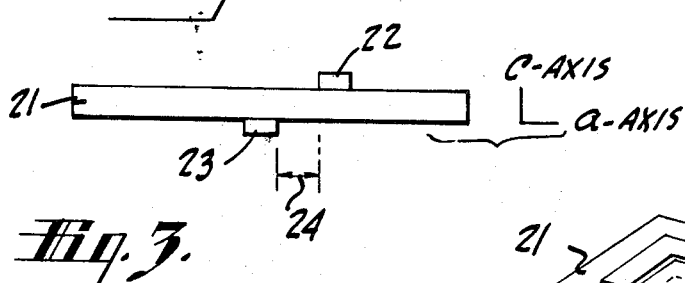
FIG. 3 is a side elevational view of the crystal shown in FIG. 2.

Poling of the $a$-axis component is achieved by the following method. As shown with reference to FIG. 2, a crystal 21 to be poled, which is free from 90° twinning, is provided with electrodes, for example electrodes 22 and 23, on opposite major faces thereof. The electrodes 22 and 23 may be applied to the crystal as a rectangular evaporated layer. The electrodes are positioned transverse to the crystallographic $a$-axis and are generally essentially parallel to each other and should be arranged with respect to one another so as to create a vectorial component of electric field parallel to the $a$-axis of the crystal when a voltage is applied thereacross. Preferably the electrodes are offset from each other, as is shown in FIGS. 2 and 3 with electrodes 22 and 23, so as to provide a gap 24 between the electrodes 22 and 23. The gap 24 is the distance between adjacent edges of electrode 22 and the projection of electrode 23 on the same surface as electrode 22, that is, the distance between electrodes as measured along the $a$-axis. However, the electrodes may overlap each other and have no such gap provided there is still a component of the electric field along the $a$-axis. Generally the gap employed is about equal to the thickness of the crystal, but may be more or less than it. For example, crystal thicknesses are typically between about 5 mils and 20 mils and gaps of up to 200 mils have been employed. The electrodes 22 and 23 are connected to a voltage source (not shown) by means of conducting wires 25 and 26 respectively. The electroded crystal 21 is then heated to a temperature somewhat below its Curie temperature, and preferably from 2–15° C. below the Curie temperature. At temperatures immediately below the Curie temperature the novel method does not result in well-poled crystals.

The Curie temperature of a bismuth titanate crystal may vary from crystal to crystal. Generally, a pure bismuth titanate crystal has a Curie temperature of 674° C. Impurities and crystal imperfections tend to lower the Curie temperature. When the Curie temperature drops below about 658° C., breakdown tends to occur upon poling.

The heated crystal is then subjected to a pulsed field having a pulse duration of typically from about 10 microseconds to about 1000 microseconds and preferably from about 30 to 100 microseconds, either as a single pulse or as a repeated unipolar train of pulses.

Typically, the magnitude of the pulses is such that the component of field parallel to the $a$-axis is in the order of 10 kv./cm. to 30 kv./cm.

For single pulse poling, a pulse magnitude of about 30 kv./cm. in the direction of the $a$-axis is preferred. For pulse train operation pulses of from about 10 kv./cm. to 20kv./cm. are preferred with repetition rates of about 1–5 pulses per second. The noval method as described above poles a region of the crystal between, and extending somewhat under the electrodes 22 and 23. That is, a region slightly larger than the gap 24.

Generally, pulse duty cycles in the order of $10^{-4}$ are preferred as this avoids ohmic heating.

The offset electrode geometry as described herein overcomes the problems of surface breakdown and internal breakdown.

Figure 4:
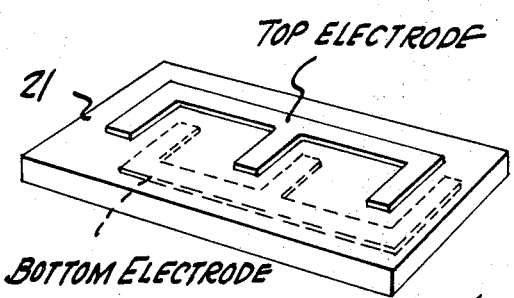
FIG. 4 is a perspective view of a bismuth titanate crystal having a comb-like configuration of electrodes useful for poling $Bi_4Ti_3O_{12}$.
Figure 5:
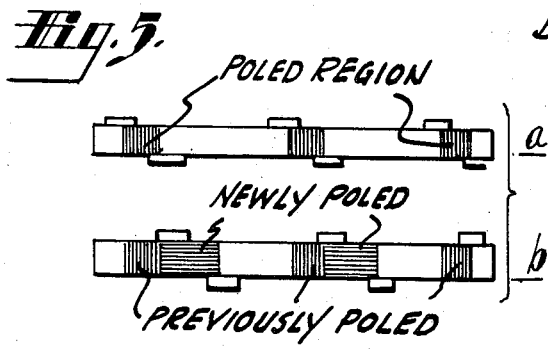
FIGS. 5$a$ and 5$b$ are both side elevational views of the crystal and electrodes of FIG. 3 indicating the regions which are poled when the electrodes are in a first position (a) and again when the electrodes are in a second position (b) adjacent to their first position.

The method can be extended to pole crystals of $Bi_4Ti_3O_{12}$ that are arbitrarily long in their $a$ and $b$ dimensions. For example, oen may employ electrodes that are moved with respect to the crystal or successive pairs of electrodes can be applied to the crystal to pole regions adjacent to previously poled regions. Still another technique that may be employed to pole a complete crystal is to utilize a series of electrodes which form a comblike structure as shown in FIGS. 3 and 4. Successively displaced, comb-likeelectrodes are then applied as shown in FIGS. 4a and 4b in order to broaden the poled regions. This is repeated until the entire crystal is poled.

As previously indicated, the crystals to be poled should be free of 90° twinning. The amount of 90° twinning can be reduced by heating twinned $Bi_4T_3O_{12}$ crystals above the Curie temperature, then cooling and annealing the crystals on alumina setters. The crystals should be isolated from one another during annealing.

A preferred method for removing 90° twinning of $Bi_4Ti_3O_{12}$ crystals is by annealing the crystals in a manner so as to subject them to a thermal gradient of the order of several degrees centrigrade per centimeter in the plane of their major faces. A typical gradient is about 2–4° C. per centimeter. A typical annealing procedure is to heat the twinned crystal to 700° C. and then cool it at a rate of 20° C. per minute to a temperature below the Curie temperature. Initial temperatures can vary from any temperature above the Curie temperature to near the decomposition point of the crystal. Cooling rates can vary over a wide range. Cooling rates in the order of 10–50° C. per minute are preferred.

We claim:

1. A method for poling a ferroelectric bismuth titanate crystal with respect to its crystallographic $a$-axis comprises heating said crystal to a temperature from between about 1–30° C. below its Curie temperature and subjecting the heated crystal to a pulsed electric field applied across opposite $ab$ crystallographic surfaces of said crystal.

2. The method recited in claim 1 wherein the electric field is applied between electrodes which are located on opposite $ab$ crystallographic surfaces of the crystal, said electrodes being arranged with respect to each other such that said electric field has a component parallel to the crystallographic $a$-axis.

3. The method recited in claim 2 wherein said electrodes are offset along the $a$-axis with respect to each other so as to form a gap between said electrodes.

4. The method recited in claim 2 wherein said crystal is heated to a temperature of between about 2–15° C. below its Curie temperature.

5. The method recited in claim 2 wherein said pulsed electric field has a field strength in the order of about 10 kv./cm. to 30 kv./cm. in the direction of the $a$-axis and a pulse duration of from about 10 to 1000 microseconds.

6. The method recited in claim 2 wherein poling is accomplished by applying a single pulse, said pulse having a field strength of about 30 kv./cm. and a pulse duration of from about 30 to 100 microseconds.

7. The method recited in ciaim 2 wherein poling is accomplished by applying a pulse train wherein each pulse has a field strength of from about 10 kv./cm. to 20 kv./cm. and a pulse duration of from about 30–100 microseconds, said pulse train having a pulse repetition rate of from about 1–5 pulses per second.

8. The method recited in claim 1 including the step of eliminating 90° twinning prior to poling of said crystal.

9. The method recited in claim 1 including the step of eliminating 90° twinning of said crystal prior to poling by heating said crystal to a temperature above the Curie temperature, and annealing said crystal by cooling said crystal at a rate in the order of 10–50° C. per hour to a temperature below the Curie temperature, while said crystal is in a temperature gradient in the order of several degrees centigrade per centimeter.

References Cited

UNITED STATES PATENTS

| | | | |
|---|---|---|---|
| 3,032,706 | 5/1962 | Wieder | 340—173.2 |
| 3,374,473 | 3/1968 | Cummings | 340—173.2 |

TERREL W. FEARS, Primary Examiner

U.S. Cl. X.R.

204—154